Figure 1:
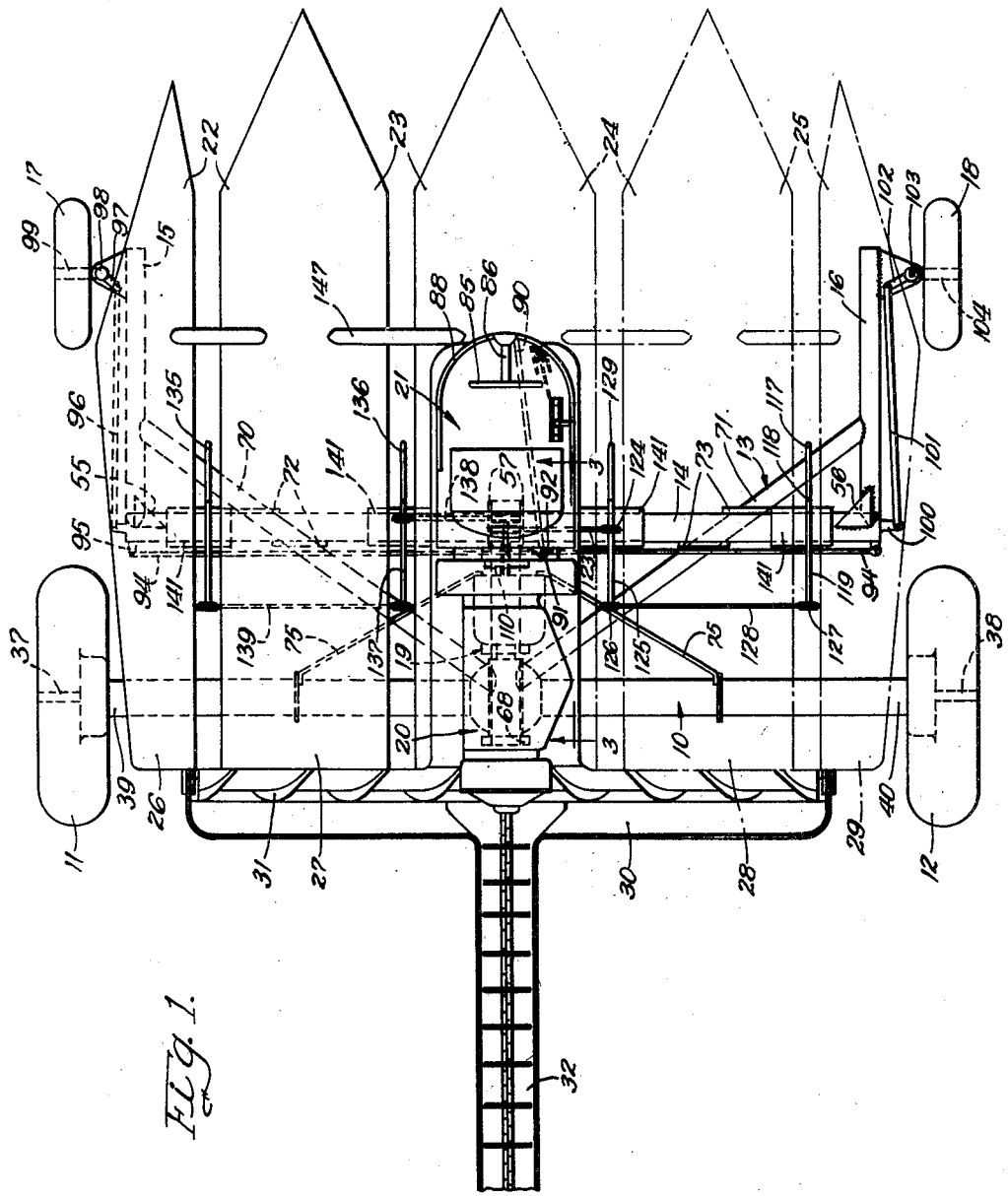

Jan. 2, 1951  N. F. ANDREWS  2,536,148
AGRICULTURAL VEHICLE WITH ARTICULATELY
CONNECTED FRAME SECTIONS
Filed Nov. 13, 1947  2 Sheets-Sheet 1

Inventor:
Norman F. Andrews
By [signatures]
Atty.

Inventor:
Norman F. Andrews

Patented Jan. 2, 1951

2,536,148

UNITED STATES PATENT OFFICE 2,536,148

AGRICULTURAL VEHICLE WITH ARTICULATELY CONNECTED FRAME SECTIONS

Norman F. Andrews. Moline, Ill., assignor to Deere & Company, Moline, Ill., a corporation of Illinois Application November 13, 1947, Serial No. 785,703

4 Claims. (Cl. 280—111)

This invention relates to a new and improved vehicle especially adapted for agricultural purposes and is principally designed from the standpoint of providing a flexible frame to which may be attached or on which may be carried a variety of agricultural implements, and particularly implements or machines of the harvester type.

In the past a great deal of design effort has been centered on providing agricultural implements especially adapted for attachment to or mounting on tractors of existing types. In many cases the program has been eminently successful, the only disadvantage being that in many cases the use of a particular implement with a tractor is tantamount to withdrawing the tractor from use for other purposes because of the difficulty with which the implement is dismounted therefrom. In some instances the complicated nature of the implement or the means for attaching the same to or mounting the same on the tractor virtually prevents convenient disassembly of the two units, in which case the owner of the tractor and implement is compelled to provide himself with an additional tractor, obviously at considerable additional expense. In other instances the special design of the implement to adapt the same for attachment to or mounting on the tractor detracts somewhat from the efficient operation of the machine as a unit and the inefficiency must be disregarded as compensated for by the desirability of operation of the tractor and implement as a unit.

According to the present invention, it is an important object to provide an inexpensive vehicle frame which will take the place of a tractor for carrying implements. To this end, many of the expensive design features of a tractor may be eliminated and the frame of the vehicle may take the form of a relatively simple frame structure including a power plant for propelling the same and for driving the moving parts of any agriculture machine that is attached thereto or mounted thereon.

Another object of the invention relates to the provision of a vehicle frame structure in which a structural part of the frame also serves as means for carrying an agricultural implement or machine. In this respect it is also contemplated, in one form of the invention, that the structural members serve also to carry or enclose driving means for the traction wheels of the vehicle. An important feature of the invention is to provide a frame that is flexible for the purpose of accommodating vertical movement of the frame components relative to each other as the wheels follow varying ground contour. In another aspect, the invention involves the mounting of a power plant and operator's station on the frame in such manner as to accommodate flexing of the frame components.

Figure 2:
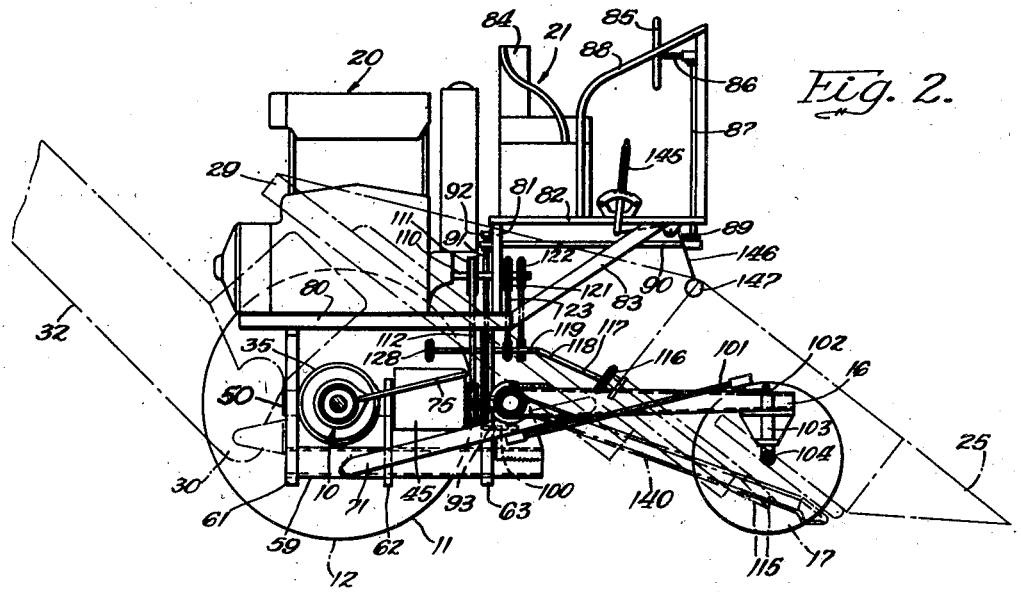
Figure 3:
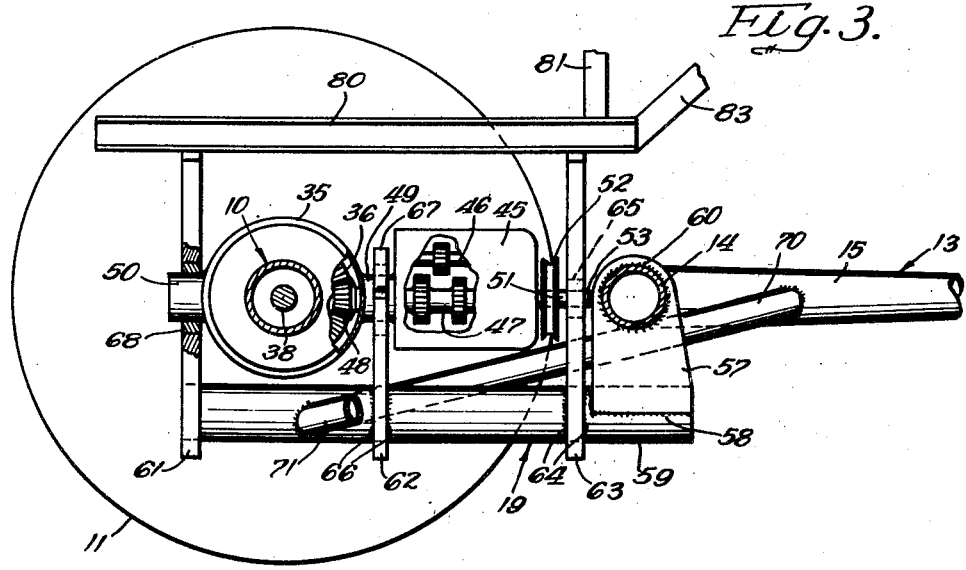

Other important objects and desirable features of the invention will become apparent as the disclosure of the preferred form thereof is completely made in the following detailed description, taken in conjunction with the accompanying sheets of drawings, in which Figure 1 is a plan view of the vehicle, shown in conjunction with a harvester of the corn picker type;

Figure 2 is a side elevational view of the same, the right hand rear wheel of the vehicle having been removed to more clearly illustrate the structural components; and Figure 3 is a fragmentary view on an enlarged scale showing the mounting of the frame components in connection with the transverse member of one of the vehicle frame sections.

For the purposes of clarity and brevity the vehicle will be described as being composed of a pair of articulately connected frame sections. The first frame section is designated generally by the numeral 10 and is shown as comprising a transverse member carried at its opposite ends on traction wheels 11 and 12, respectively. The second frame section is designated by the numeral 13 and is here illustrated as being of U-shaped, the components forming the elements of the U; the transverse or bight portion of the U being formed by a transverse frame component or member 14 and the legs of the U being provided by fore and aft extending left and right hand frame members 15 and 16, respectively. The forward end of the frame member 15 is carried for travel over the ground by means including a steerable wheel 17 and the forward end of the right hand member 16 is similarly carried by a steerable wheel 18. The frame sections 10 and 13 are connected in load-supporting relation and for relative articulation by means of a longitudinal connection, indicated generally by the numeral 19. The vehicle is propelled by means of a power plant, indicated generally by the numeral 20, carried on the second frame section 13 behind an operator's station 21 which is likewise carried on the second frame section.

The transverse member 14 of the U frame section 13, in addition to forming a structural component of the frame 13, serves also as means for carrying an agricultural implement. The present disclosure is based upon the use of the vehicle in connection with a four-row corn picker having picker units 22, 23, 24 and 25; although, it will be appreciated that the vehicle is adapted to a wide variety of implements. Hence, the disclosure should be taken as illustrative and not limiting. The picker units further include, as is conventional, rearwardly and upwardly inclining elevators 26, 27, 28 and 29 which deliver picked corn to a transverse hopper 30 in which is located a transversely operating auger 31 which functions to convey corn to a central point in the hopper adjacent the receiving end of a rearwardly and upwardly inclining wagon elevator 32.

The transverse member 10 of the first frame section is in the form of a transverse axle structure carrying rigidly intermediate its ends a differential gear casing 35 within which may be located the usual differential gear (not shown). The differential gearing is associated in the conventional manner with a bevel ring gear 36 (Figure 3) and further with a pair of oppositely extending drive axles 37 and 38 for delivering power to the traction wheels 11 and 12, respectively (Figure 1).

The differential gear casing 35 is located rearwardly of a longitudinally aligned change-speed gear transmission housing 45, which may include the conventional change-speed gearing as indicated generally at 46 in Figure 3. The change-speed gearing may further include the usual power delivery shaft 47 which extends rearwardly into the differential casing 35 and has keyed thereto a bevel pinion 48 in constant mesh with the bevel ring gear 36 of the differential gearing assembly. The housings or casings 35 and 45 are rigidly interconnected by a short longitudinal housing portion 49 which in addition journals the intermediate portion of the power delivery shaft 47. The change-speed gearing assembly further includes a forwardly extending shaft 51 which has keyed thereto a driving pulley 52. The shaft 51 extends still further forwardly and includes a portion 53 providing a bearing for a purpose to presently appear.

The U-shaped structure of the frame section 13 is, as aforesaid, made up of the transverse member 14 and the opposite side members 15 and 16. The members 15 and 16 are respectively rigidly secured, as by welding, to opposite end portions of the transverse member 14. These members are further braced by triangular gusset plates 55 and 56. The transverse member 14 is provided intermediate its ends with a pair of transversely spaced depending plates 57 rigidly secured at their lower ends, as by welding at 58, to a longitudinally extending member 59 preferably of tubular construction. The upper end portions of the plates 57 are perforated to provide for passage therethrough of the transverse member 14 and are welded, as at 60, to the transverse member. The member 59 thus becomes an integral rigid part of the frame section 13.

As best shown in Figure 3, the frame member 59 extends rearwardly below the axle structure 10 and below the transmission housing 45 and is provided with a plurality of upwardly extending supports 61, 62 and 63. The support 63 is rigidly secured, preferably by welding at 64, to a forward portion of the member 59, and extends upwardly to a level somewhat above the upper level of the rear axle structure 10 and transmission housing 45. The member 63 is provided intermediate its ends with a bearing 65 which receives the forward extension 53 of the transmission input shaft 51. The member 62 is welded at 66 to an intermediate portion of the longitudinal tubular member 59. The upper portion of the member 62 is provided as a split bearing 67 which receives the bearing portion 49 between the housings 35 and 45. The lower portion of the rear supporting member 61 is preferably removably carried by the longitudinal member 59 and extends upwardly from the member 59 to a point level with the upper end of the forward supporting member 63. An intermediate portion of the rear supporting member 61 is provided with a bearing 68 which receives the rear bearing 50 on the differential gear casing 35. The structure just described is included in the connection 19 and provides means whereby the frame section 13 is articulately connected to the frame section 10 on a longitudinal pivot axis, so that the frame section 13 may have relative movement about this axis with respect to the axle structure 10. The longitudinally spaced bearings 50—68, 49—67, and 53—65 increase the stability of the connection by preventing twisting of the frame section 13 about an axis through the axle structure 10.

Further rigidity is imparted to the frame section 10 by means of a pair of diagonal braces 70 and 71 which extend inwardly and rearwardly respectively from the side members 15 and 16 and converge toward and are rigidly secured to the longitudinal tubular member 59 between the supporting members 61 and 62. The diagonal braces are preferably secured to the parts mentioned by welding; although, any other suitable securing means may be utilized. The diagonal braces are further secured to the transverse member 14, the brace 70 being secured to the member 14 by a pair of depending plates 72 and the brace 71 being secured to the member 14 by means of a pair of depending plates 73 (Figure 1).

The transmission housing 45 is additionally braced with respect to the transverse axle structure 10 by a pair of diagonal braces 75 (Figures 1 and 2). In the case of each frame section, considerable care has been directed to the provision of simplified frame structure that is relatively easy and inexpensive to manufacture, yet that is sturdy and long-lived in use.

The upper ends of the supporting members 61 and 63 serve as means by which the frame section 13 carries superstructure, part of which is the power plant 20 and another part of which is the operator's station 21. For this purpose there is mounted on the upper ends of the members 61 and 63 a pair of longitudinally extending frame members 80 (only one of which appears in the drawings), each in the form of an outwardly facing channel. These channels serve to carry the power plant 20 directly thereon, thus supporting the power plant 20 on the frame section 13 wholly independently of any support on the axle structure 10. Consequently, vertical movement of the axle structure 10 as the wheels 11 or 12 encounter varying ground contour will not cause any movement of the power plant. The supporting members 61 and 63, by means of the frame members 80, serve to carry the additional part of the superstructure represented by the operator's station 21. To this end the forward end portions of the members 80 are provided with vertically extending supporting members 81 which project upwardly to a level somewhat above the general level of the forward portion of the picker units 22, 23, 24 and 25. The members 81 suitably support the rear end of a longitudinally forwardly extending platform 82, the forward end of which is braced to the members 80 by a pair of rearwardly extending braces 83 (only one of which is shown in the drawings). In the present disclosure the platform 82 is shown as carrying at its rear end an operator's seat 84 ahead of which is located a steering wheel 85 having a short forwardly extending shaft 86 appropriately connected to a vertical steering shaft 87. An appropriate guard rail 88 is provided at the forward portion of the platform 82.

The lower end of the steering shaft 87 projects below a forward portion of the platform 82 and has keyed thereto a transversely extending steering arm 89. The arm 89 is connected by a rearwardly extending steering link 90 to suitable means for rocking a vertical shaft 91. This shaft may be journaled at its upper end in a bearing 92 carried by one of the members 81 and may be further journaled at its lower end in an appropriate bearing (not shown) on the transverse member 14. The lower end of the shaft 91 has keyed thereto a forwardly extending arm 93 (Figure 2) which is connected to a transverse tie rod 94 (Figure 1). The tie rod projects at its left hand end and is connected thereat to a bell crank 95. The bell crank is connected by a longitudinally extending link 96 to a steering arm 97 carried at the upper end of a spindle 98 which includes a stub axle 99 for journaling the left hand steerable wheel 17. The right hand end of the tie rod 94 is connected to a bell crank 100 which is in turn connected by a link 101 to a steering arm 102 at the upper end of a spindle 103 which has a short stub axle 104 for journaling the right hand steerable wheel 18. The steering mechanism illustrated is representative of several types of mechanisms that may be employed and it is not intended that the invention be limited by the disclosure in this respect. The vehicle is propelled by means of a driving connection between the power plant 20 and the traction wheels 11 and 12. This driving connection includes the differential gearing 36—48 and the transmission gearing 45. The forward end of the power plant 20 includes a power shaft 110, which may be an extension of the engine crank shaft. This shaft has keyed thereto a driving pulley 111; and a belt 112 is trained about the pulley 111 and the pulley 52. Inasmuch as the pivot axis about which the frame sections 10 and 13 have relative movement passes through the axis of the transmission shaft 47, there will be no interference with the drive connection between the power plant and transmission because of such relative movement; that is to say, such relative movement will not affect the length of the driving belt 112.

The power plant 20 also provides a source of power for driving movable parts of the implement. In this case such movable parts are a plurality of snapping rolls, for example, a representation of which appears at 115 in Figure 2, it being understood that each of the other units 22, 23 and 24 is likewise equipped with such pair of snapping rolls. The upper ends of each pair of snapping rolls 115 are geared together at 116 so that they rotate in opposite directions, as is conventional. One of the gears is connected by a rearwardly extending shaft 117 and universal joint 118 to a horizontal, longitudinally extending shaft 119. The shaft 119 may be suitably carried by bearings on the superstructure, the details of which are not illustrated. The driving shaft 110 of the power plant 20 extends forwardly below the operator's station 21 and has keyed thereto a pair of driving sprockets 121 and 122. The sprocket 121 is connected by a driving chain 123 to a sprocket 124 which is keyed to a longitudinally extending shaft 125 spaced laterally to the right of and paralleling the power plant shaft 110. The shaft 125 extends rearwardly and carries at its extreme rear end for rotation therewith a driving sprocket 126. This sprocket is in lateral alignment with a similar sprocket 127 keyed to the rear end of the shaft 119 (Figure 1) and the two sprockets are drivingly interconnected by a driving chain 128. Power from the power plant is thus transmitted through the shaft 110 to the sprocket 121, then through the chain 123 to the sprocket 124, and by means of the shaft 125, sprocket 126, chain 128 and sprocket 127 to the shaft 119, and thence to the snapping rolls 115.

The shaft 125 extends forwardly of the sprocket 124 and is provided with a universal joint connected to a forwardly extending shaft 129 (Figure 1). The shaft 129 may be connected to a pair of geared snapping rolls (not shown) similar to the snapping rolls 115 and provided for the picker unit 24.

Similar snapping roll driving mechanism may be provided for the picker units 22 and 23. Although the snapping rolls for these units have been omitted from the drawings, there are shown two shafts 135 and 136 which correspond in function to the shafts 117 and 129. The shaft 136 is connected by a universal joint to a shaft 137 which includes a first sprocket and chain connection 138 to the second sprocket 122 on the power shaft 110 and a second sprocket and chain connection 139 to the shaft 135.

The driving means illustrated and described are merely representative of many that could be employed, it being understood that several types of implements could be mounted on the transverse member 14. The feature of the invention in this respect is that the power plant includes the power take-off means, in the form of the sprockets 121 and 122, for driving rotatable or other movable parts of implements carried by the vehicle. Any conventional drive mechanism may be employed, for example, for driving the transverse auger 31 and wagon elevator 32. Since the construction in this respect is a matter of choice, details have not been illustrated or described.

It is entirely feasible that implements carried by the implement-supporting member 14 be of conventional or standard construction. The illustration of the corn picker in the present case has been made with this point in mind. As is conventional, a picker of this type is mounted for vertical floating movement with respect to the vehicle frame on which it is carried. To this end the picker is shown as including a plurality of rearwardly and upwardly extending frame bars 140, a single representation of which is illustrated in Figure 2. The frame bars may be connected at their rearward ends to the transverse support 14 by means providing for relative vertical movement of the frame bars about the transverse axis of the member 14. For this purpose the member 14 may be provided with a plurality of transversely spaced apart sleeves 141 to which the rear ends of the bars 140 may be connected. Again, the illustration in this respect is only illustrative and has not been carried out in great detail. Inasmuch as the picker is mounted for vertical movement about the axis of the member 14, means may be provided for raising and lowering the picker. This means is here illustrated as comprising a hand lever 145 carried by the operator's platform 82 ahead of the seat 84 and including a pulley and cable connection 146 to a transverse support 147 associated with the picker units 22, 23, 24 and 25. Raising and lowering of the picker units may be accomplished simultaneously under control of the operator by means of the hand lever 145.

It is characteristic of the preferred example of the invention illustrated herein that the entire implement is carried independently of the rear axle structure 10. The picker units 22, 23, 24 and 25 are carried by the transverse member 14. The rear part of the picker or implement, represented by the transverse hopper 30 and wagon elevator 32, is carried by the superstructure including the members 61, 80 and 63. The construction in this respect permits comparatively wide freedom of movement between the frame sections 10 and 13. Likewise, the operator's station and power plant are carried by the superstructure independently of any support on the transverse axle 10.

Other features and advantages of the invention will undoubtedly occur to those skilled in the art, as will numerous modifications and alterations in the preferred form of the invention illustrated. It is therefore not desired to limit the invention by the precise details disclosed.

I claim:

1. A vehicle frame structure having front and rear ends, comprising: a rear frame section including a transverse member of rigid construction having opposite end portions adapted to be wheel-supported; a front frame section of generally U-shaped, rigid construction made up of a transverse member forming the bight of the U and a pair of transversely spaced apart, longitudinal members, said front section being arranged wholly ahead of the rear-section transverse member with the two transverse members generally in parallelism and in a substantially horizontal plane, and with the longitudinal members extending forwardly generally in said horizontal plane and having forward end portions adapted to be wheel-supported; means interconnecting the frame sections, including a longitudinal support connecting the two transverse members and providing a pivot on a longitudinal axis intermediate the opposite end portions of the rear-section transverse member; and means including a pair of forwardly diverging braces having rear end portions connected to the longitudinal support and front end portions connected respectively to the longitudinal members of the front frame sections.

2. The invention defined in claim 1, further characterized in that: each brace crosses and is connected to the transverse member of the front frame section so that said braces respectively brace the corners of the U provided at the junction of the front-frame-section transverse and longitudinal members.

3. The invention defined in claim 1, further characterized in that: the longitudinal support extends rearwardly below the rear-section transverse member and is connected thereto by vertical supports spaced respectively behind and ahead of said rear-section transverse member.

4. The invention defined in claim 1, further characterized in that: the forwardly diverging braces form, with the front-frame-section transverse member, a generally triangular space ahead of the rear-section transverse member; and the longitudinal support is offset below both transverse members and below said space.

NORMAN F. ANDREWS.

REFERENCES CITED

The following references are of record in the file of this patent:

UNITED STATES PATENTS

| Number | Name | Date |
|---|---|---|
| 641,096 | French | Jan. 9, 1900 |
| 2,152,273 | Otto | Mar. 28, 1939 |
| 2,323,817 | Lee | July 6, 1943 |
| 2,378,615 | Brown | June 19, 1945 |